(12) United States Patent
Brennan et al.

(10) Patent No.: US 8,916,010 B2
(45) Date of Patent: Dec. 23, 2014

(54) COMPOSITE MANUFACTURING METHOD

(75) Inventors: Joseph D. Brennan, Shoreline, WA (US); Darrell D. Jones, Mill Creek, WA (US); Kurtis S. Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 956 days.

(21) Appl. No.: 11/952,222

(22) Filed: Dec. 7, 2007

(65) Prior Publication Data

US 2009/0145545 A1    Jun. 11, 2009

(51) Int. Cl.
| | | |
|---|---|---|
| *B29C 65/00* | (2006.01) | |
| *B29C 70/38* | (2006.01) | |
| *B29C 70/30* | (2006.01) | |
| *B29C 70/54* | (2006.01) | |
| *B29C 35/02* | (2006.01) | |
| *B29L 31/30* | (2006.01) | |

(52) U.S. Cl.
CPC ............ *B29C 70/38* (2013.01); *B29C 66/4326* (2013.01); *B29C 66/1162* (2013.01); *Y02T 50/433* (2013.01); *B29C 70/30* (2013.01); *Y02T 50/43* (2013.01); *B29C 35/02* (2013.01); *B29C 66/435* (2013.01); *B29C 66/721* (2013.01); *B29C 66/1286* (2013.01); *B29L 2031/3082* (2013.01); *B29C 70/545* (2013.01); *B29C 66/7212* (2013.01); *B29C 66/1282* (2013.01)
USPC .......... 156/64; 156/263; 156/275.5; 156/245; 156/123; 156/157; 156/159; 156/196; 156/217

(58) Field of Classification Search
USPC ........ 156/64, 263, 275.5, 245, 123, 157, 159, 156/196, 217, 378, 379; 29/428, 897.2
See application file for complete search history.

(56) References Cited

U.S. PATENT DOCUMENTS

| | | |
|---|---|---|
| 2,374,894 A | 5/1945 | Scarlett et al. |
| 2,679,278 A | 5/1954 | Clark |
| 3,101,290 A | 8/1963 | Frederic et al. |
| 3,739,166 A | 6/1973 | Anderson |
| 3,967,996 A | 7/1976 | Kamov et al. |
| 3,983,282 A | 9/1976 | Seemann, III |
| 4,015,035 A | 3/1977 | Blad et al. |
| 4,016,022 A | 4/1977 | Browning et al. |
| 4,049,484 A | 9/1977 | Priest et al. |
| 4,120,632 A | 10/1978 | Stoeberl |
| 4,132,755 A | 1/1979 | Johnson |

(Continued)

FOREIGN PATENT DOCUMENTS

| | | |
|---|---|---|
| DE | 10200404652 A1 | 4/2005 |
| EP | 0230682 A2 | 8/1987 |

(Continued)

OTHER PUBLICATIONS

USPTO Office Action dated Jun. 2, 2010 U.S. Appl. No. 11/751,931, pp. 15.

(Continued)

*Primary Examiner* — George Koch
(74) *Attorney, Agent, or Firm* — Yee & Associates, P.C.

(57) ABSTRACT

A modular composite manufacturing method. An illustrative embodiment of the method includes providing a plurality of composite modules; inspecting the composite modules; providing a curing tool; and placing the composite modules on the curing tool.

25 Claims, 5 Drawing Sheets

(56) References Cited

U.S. PATENT DOCUMENTS

| | | | |
|---|---|---|---|
| 4,208,238 A | 6/1980 | August et al. | |
| 4,238,539 A | 12/1980 | Yates et al. | |
| 4,287,015 A | 9/1981 | Danner, Jr. | |
| 4,476,797 A | 10/1984 | Ivanov et al. | |
| 4,491,081 A | 1/1985 | Ivanov | |
| 4,491,493 A * | 1/1985 | Eaton | 156/235 |
| 4,496,412 A | 1/1985 | Ritter | |
| 4,548,859 A | 10/1985 | Kline et al. | |
| 4,554,036 A | 11/1985 | Newsom | |
| 4,564,543 A | 1/1986 | Ritter | |
| 4,588,626 A | 5/1986 | Cologna et al. | |
| 4,622,091 A | 11/1986 | Letterman | |
| 4,698,115 A | 10/1987 | Dodds | |
| 4,741,943 A | 5/1988 | Hunt | |
| 4,824,513 A | 4/1989 | Dodds | |
| 4,875,962 A | 10/1989 | Breakspear | |
| 4,902,215 A | 2/1990 | Seemann, III | |
| 4,917,353 A | 4/1990 | Riley | |
| 4,934,199 A | 6/1990 | Avila et al. | |
| 4,942,013 A | 7/1990 | Palmer et al. | |
| 4,945,488 A | 7/1990 | Carver et al. | |
| 4,961,799 A | 10/1990 | Cologna et al. | |
| 4,987,700 A | 1/1991 | Westerman et al. | |
| 5,033,014 A * | 7/1991 | Carver et al. | 703/1 |
| 5,034,254 A | 7/1991 | Cologna et al. | |
| 5,052,906 A | 10/1991 | Seemann | |
| 5,071,338 A | 12/1991 | Dublinski et al. | |
| 5,087,193 A | 2/1992 | Herbert, Jr. | |
| 5,116,216 A | 5/1992 | Cochran et al. | |
| 5,123,985 A | 6/1992 | Evans et al. | |
| 5,129,813 A | 7/1992 | Shepherd | |
| 5,167,742 A | 12/1992 | Peters | |
| 5,180,046 A | 1/1993 | Hutton et al. | |
| 5,190,611 A | 3/1993 | Cologna et al. | |
| 5,207,541 A | 5/1993 | Westerman et al. | |
| 5,217,669 A | 6/1993 | Dublinski et al. | |
| 5,290,386 A | 3/1994 | Trudeau | |
| 5,316,462 A | 5/1994 | Seemann | |
| 5,350,614 A | 9/1994 | Chase et al. | |
| 5,359,887 A | 11/1994 | Schwab et al. | |
| 5,364,584 A | 11/1994 | Imanara et al. | |
| 5,427,518 A | 6/1995 | Morizot et al. | |
| 5,427,725 A | 6/1995 | White et al. | |
| 5,429,326 A | 7/1995 | Garescheé et al. | |
| 5,439,635 A | 8/1995 | Seemann | |
| 5,441,692 A | 8/1995 | Taricco | |
| 5,514,232 A | 5/1996 | Burns | |
| 5,576,030 A | 11/1996 | Hooper | |
| 5,601,852 A | 2/1997 | Seemann | |
| 5,612,492 A | 3/1997 | Schwab et al. | |
| 5,667,881 A | 9/1997 | Rasmussen et al. | |
| 5,683,646 A | 11/1997 | Reiling, Jr. | |
| 5,702,663 A | 12/1997 | Seemann | |
| 5,721,034 A | 2/1998 | Seemann, III et al. | |
| 5,759,325 A | 6/1998 | Davis | |
| 5,780,721 A | 7/1998 | Levens | |
| 5,820,894 A | 10/1998 | Kreutzer | |
| 5,879,489 A | 3/1999 | Burns et al. | |
| 5,882,756 A | 3/1999 | Alston et al. | |
| 5,904,972 A | 5/1999 | Tunis, III et al. | |
| 5,932,256 A | 8/1999 | Mandish | |
| 5,939,013 A | 8/1999 | Han et al. | |
| 5,954,898 A | 9/1999 | McKague et al. | |
| 5,958,325 A | 9/1999 | Seemann, III et al. | |
| 6,090,335 A | 7/2000 | McClure et al. | |
| 6,096,164 A | 8/2000 | Benson et al. | |
| 6,206,067 B1 | 3/2001 | Kociemba et al. | |
| 6,211,497 B1 | 4/2001 | Matsen et al. | |
| 6,284,089 B1 * | 9/2001 | Anderson et al. | 156/304.3 |
| 6,298,896 B1 | 10/2001 | Sherrill et al. | |
| 6,299,819 B1 | 10/2001 | Han | |
| 6,355,203 B1 | 3/2002 | Charmes et al. | |
| 6,391,246 B2 | 5/2002 | Shiraishi et al. | |
| 6,391,436 B1 | 5/2002 | Xu et al. | |
| 6,406,659 B1 | 6/2002 | Lang et al. | |
| 6,408,517 B1 | 6/2002 | Lehmker et al. | |
| 6,461,551 B1 | 10/2002 | Mandish | |
| 6,510,977 B1 | 1/2003 | Hertz | |
| 6,533,985 B1 | 3/2003 | Smith | |
| 6,551,091 B1 | 4/2003 | Bryant et al. | |
| 6,575,218 B1 | 6/2003 | Burns et al. | |
| 6,579,418 B2 | 6/2003 | Lindsay et al. | |
| 6,589,472 B1 | 7/2003 | Benson et al. | |
| 6,638,466 B1 * | 10/2003 | Abbott | 264/238 |
| 6,689,438 B2 | 2/2004 | Kennedy et al. | |
| 6,692,681 B1 * | 2/2004 | Lunde | 264/510 |
| 6,696,690 B2 | 2/2004 | Benne | |
| 6,761,783 B2 | 7/2004 | Keller et al. | |
| 6,797,390 B2 | 9/2004 | Asai et al. | |
| 6,808,143 B2 * | 10/2004 | Munk et al. | 244/123.1 |
| 6,830,079 B1 | 12/2004 | Ahrens et al. | |
| 6,860,957 B2 | 3/2005 | Sana et al. | |
| 6,919,039 B2 | 7/2005 | Lang et al. | |
| 7,029,267 B2 | 4/2006 | Caron | |
| 7,127,950 B2 | 10/2006 | Fonov et al. | |
| 7,137,182 B2 * | 11/2006 | Nelson | 29/428 |
| 7,141,191 B2 | 11/2006 | Engwall et al. | |
| 7,186,367 B2 | 3/2007 | Hou et al. | |
| 7,228,611 B2 | 6/2007 | Anderson et al. | |
| 7,294,220 B2 | 11/2007 | Anderson | |
| 7,306,450 B2 | 12/2007 | Hanson | |
| 7,398,586 B2 | 7/2008 | Prichard et al. | |
| 7,398,698 B2 | 7/2008 | Griess et al. | |
| 7,413,694 B2 | 8/2008 | Waldrop, III et al. | |
| 7,503,368 B2 | 3/2009 | Chapman et al. | |
| 7,521,105 B2 | 4/2009 | Bech et al. | |
| 7,527,759 B2 | 5/2009 | Lee et al. | |
| 7,534,615 B2 | 5/2009 | Havens | |
| 7,622,066 B2 | 11/2009 | Brustad et al. | |
| 7,624,488 B2 | 12/2009 | Lum et al. | |
| 7,628,879 B2 | 12/2009 | Ackerman | |
| 7,655,168 B2 | 2/2010 | Jones et al. | |
| 7,762,122 B2 | 7/2010 | Advani et al. | |
| 7,849,729 B2 | 12/2010 | Miller et al. | |
| 7,871,040 B2 | 1/2011 | Lee et al. | |
| 7,963,038 B2 | 6/2011 | Schmitz | |
| 7,964,049 B2 | 6/2011 | Kapur et al. | |
| 8,003,034 B2 | 8/2011 | Oldani et al. | |
| 8,114,673 B2 | 2/2012 | Mills et al. | |
| 8,409,396 B2 | 4/2013 | Bech et al. | |
| 2002/0060018 A1 | 5/2002 | Lindsay et al. | |
| 2003/0082321 A1 | 5/2003 | Kennedy et al. | |
| 2003/0175511 A1 | 9/2003 | Asai et al. | |
| 2004/0026025 A1 | 2/2004 | Sana et al. | |
| 2004/0031567 A1 * | 2/2004 | Engelbart et al. | 156/379 |
| 2004/0258562 A1 | 12/2004 | Mills et al. | |
| 2005/0086916 A1 | 4/2005 | Caron | |
| 2005/0102814 A1 * | 5/2005 | Anderson et al. | 29/455.1 |
| 2005/0112772 A1 | 5/2005 | Farone et al. | |
| 2005/0161154 A1 | 7/2005 | Anderson | |
| 2005/0230055 A1 * | 10/2005 | Sana et al. | 156/516 |
| 2005/0236735 A1 * | 10/2005 | Oldani et al. | 264/257 |
| 2005/0253309 A1 | 11/2005 | Hou et al. | |
| 2006/0108058 A1 * | 5/2006 | Chapman et al. | 156/245 |
| 2006/0118235 A1 * | 6/2006 | Lum et al. | 156/285 |
| 2006/0121613 A1 | 6/2006 | Havens | |
| 2007/0029527 A1 | 2/2007 | Mills et al. | |
| 2007/0107189 A1 | 5/2007 | Prichard et al. | |
| 2007/0272582 A1 | 11/2007 | Lau | |
| 2007/0289246 A1 | 12/2007 | Schmitz | |
| 2008/0023015 A1 | 1/2008 | Arnold et al. | |
| 2008/0111024 A1 | 5/2008 | Lee et al. | |
| 2008/0148817 A1 | 6/2008 | Miller et al. | |
| 2008/0178996 A1 | 7/2008 | Tada et al. | |
| 2008/0308674 A1 | 12/2008 | Frantz et al. | |
| 2009/0120562 A1 | 5/2009 | Tsotsis et al. | |
| 2009/0148647 A1 | 6/2009 | Jones et al. | |
| 2009/0211698 A1 | 8/2009 | McCowin | |
| 2009/0273107 A1 | 11/2009 | Advani et al. | |
| 2009/0320292 A1 | 12/2009 | Brennan et al. | |
| 2010/0011580 A1 | 1/2010 | Brennan et al. | |
| 2010/0012260 A1 | 1/2010 | Brennan et al. | |
| 2010/0078126 A1 | 4/2010 | Brennan et al. | |
| 2010/0170326 A1 | 7/2010 | Miller et al. | |

(56) References Cited

U.S. PATENT DOCUMENTS

| | | | |
|---|---|---|---|
| 2011/0079174 | A1 | 4/2011 | Miller et al. |
| 2011/0259086 | A1 | 10/2011 | Harris et al. |
| 2011/0259515 | A1 | 10/2011 | Rotter et al. |
| 2013/0011586 | A1 | 1/2013 | Landry et al. |

FOREIGN PATENT DOCUMENTS

| | | | |
|---|---|---|---|
| EP | 0271263 | A2 | 6/1988 |
| EP | 0319449 | A2 | 6/1989 |
| EP | 0348831 | A2 | 1/1990 |
| EP | 0391641 | B1 | 10/1990 |
| EP | 0629497 | A2 | 12/1994 |
| EP | 0816438 | A2 | 1/1998 |
| EP | 1038656 | A1 | 9/2000 |
| EP | 1780120 | A2 | 5/2007 |
| EP | 1995044 | A2 | 11/2008 |
| EP | 1995045 | A2 | 11/2008 |
| EP | 2067611 | A1 | 6/2009 |
| EP | 0391641 | A3 | 7/2010 |
| EP | 2383106 | A2 | 2/2011 |
| EP | 2383559 | A1 | 4/2011 |
| EP | 2444240 | A1 | 4/2012 |
| GB | 2478848 | A | 9/2011 |
| JP | 60252235 | A | 12/1985 |
| JP | 62259059 | A | 11/1987 |
| JP | H06242087 | A | 9/1994 |
| JP | 2002254429 | A | 9/2002 |
| JP | 2004309379 | A | 11/2004 |
| KR | 19970058260 | | 11/1997 |
| WO | 9322127 | A1 | 11/1993 |
| WO | 0176892 | A1 | 10/2001 |
| WO | 02099416 | A1 | 12/2002 |
| WO | 03021252 | A1 | 3/2003 |
| WO | 2004031321 | A1 | 4/2004 |
| WO | WO2004057120 | A2 | 7/2004 |
| WO | 2005056391 | A2 | 6/2005 |
| WO | 2005059500 | A1 | 6/2005 |
| WO | 2006110627 | A1 | 10/2006 |
| WO | 2006118692 | A1 | 11/2006 |
| WO | 2008054499 | A2 | 5/2008 |
| WO | 2008088435 | A1 | 7/2008 |
| WO | 2010025376 | A1 | 3/2010 |

OTHER PUBLICATIONS

USPTO Office Action dated May 20, 2011 for U.S. Appl. No. 11/751,931, pp. 31.
USPTO Final Office Action dated Aug. 11, 2010 for U.S. Appl. No. 11/751,931, pp. 29.
USPTO Final Office Action dated Sep. 28, 2011 for U.S. Appl. No. 11/751,931, pp. 24.
USPTO Office Action dated Apr. 13, 2011 for U.S. Appl. No. 11/751,928, pp. 19.
USPTO Office Action dated Jan. 19, 2012 for U.S. Appl. No. 11/751,928, pp. 13.
USPTO Final Office Action dated Jun. 23, 2011 for U.S. Appl. No. 11/751,928, pp. 11.
USPTO Office Action dated May 17, 2010 for U.S. Appl. No. 12/200,882, pp. 11.
USPTO Final to Office Action dated Oct. 26, 2010 for U.S. Appl. No. 12/200,882, pp. 8.
Response to Office Action dated Aug. 11, 2010 for U.S. Appl. No. 12/200,882, pp. 20.
Response to Office Action dated Jan. 24, 2011 for U.S. Appl. No. 12/200,882, pp. 17.
Korea Patent Office Action dated Jun. 11, 2010 for application 2008-47564 pp. 9.
Korea Patent Office Action dated Jun. 21, 2010 for application 2008-47566 pp. 14.
European Search Report dated Mar. 13, 2009 pp. 9.
Lee et al., "Novel UV-Activated Colorimetric Oxygen Indicator," Chemistry of Materials, vol. 17, No. 10, May 2005, pp. 2744-2751.
Campbell (Ed.), "Ply Collation: A Major Cost Driver, In: Manufacturing Processes for Advanced Composites," Elsevier Advanced Technology, Oxford, UK, pp. 131-173, 2004.
Jayaweera et al., "Adaptive robotic assembly of compliant aerostructure components," Robotics and Computer-Integrated Manufacturing, vol. 23, No. 2, pp. 180-194, Jan. 2007.
Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).
International Search Report dated May 29, 2008 regarding Application No. PCT/US2007/023455 (WO2008088435), 3 pages.
International Search Report dated Jul. 15, 2011 regarding Application No. GB1104472.4 (GB2478848), 5 pages.
European Search Report dated Sep. 15, 2011 regarding Application No. EP11160866 (EP2383106), 4 pages.
USPTO Office Action dated Mar. 10, 2010 regarding U.S. Appl. No. 11/829,900, 10 pages.
USPTO Notice of Allowance dated Jul. 30, 2010 regarding U.S. Appl. No. 11/829,900, 8 pages.
USPTO Office Action dated Feb. 21, 2012 regarding U.S. Appl. No. 12/906,489, 15 pages.
USPTO Office Action dated Jul. 27, 2010 regarding U.S. Appl. No. 12/242,477, 13 pages.
USPTO Final Office Action dated Dec. 2, 2010 regarding U.S. Appl. No. 12/242,477, 15 pages.
USPTO Office Action dated Nov. 14, 2011 regarding U.S. Appl. No. 12/768,007, 20 pages.
El Amin, "Nano ink indicates safety breach in food packaging," http://www.foodproductiondaily.com/Quality-Safety/Nano-ink-indicates-safety-breach-in-food-packaging, Nov. 14, 2006, 2 pages.
European Search Report, dated Sep. 30, 2011, regarding Application No. EP11160843 (EP2383559), 7 pages.
Lee et al., "Novel UV-Activated Colorimetric Oxygen Indicator," Chemistry of Materials, vol. 17, No. 10, May 2005, pp. 2744-2751. (Abstract).
Mills et al., "UV-Activated Luminescence/Colourimetric O2 Indicator," International Journal of Photoenergy, vol. 2008, 2008, 6 pages.
Setnescu et al., "Polymer Films Doped with Colorants as Oxygen Sensitive Materials," Journal of Optoelectrics and Advanced Materials, vol. 8, No. 2, Apr. 2006, pp. 682-686.
USPTO Final Office Action, dated Jun. 20, 2012, regarding U.S. Appl. No. 11/751,928, 20 pages.
USPTO Notice of Allowance, dated Jun. 13, 2012, regarding U.S. Appl. No. 12/906,489, 9 pages.
USPTO Office Action, dated Apr. 26, 2012, regarding U.S. Appl. No. 12/764,202, 13 pages.
USPTO Final Office Action, dated May 3, 2012, regarding U.S. Appl. No. 12/768,007, 29 pages.
USPTO Notice of Allowance, dated Jul. 5, 2012, regarding U.S. Appl. No. 12/242,477, 9 pages.
Notice of Allowance, dated Sep. 21, 2012, regarding U.S. Appl. No. 12/725,380, 19 pages.
Notice of Allowance, dated Sep. 14, 2012, regarding U.S. Appl. No. 12/906,489, 34 pages.
Final Office Action, dated Nov. 16, 2012, regarding U.S. Appl. No. 12/764,202, 31 pages.
Brennan et al., "Compaction of Prepreg Plies on Composite Laminate Structures," U.S. Appl. No. 13/657,137 and Preliminary Amendment, filed Oct. 22, 2012, 37 pages.
Final Office Action, dated Jul. 29, 2013, regarding U.S. Appl. No. 12/200,882, 10 pages.
Final Office Action, dated Aug. 15, 2013, regarding U.S. Appl. No. 12/764,202, 16 pages.
Material Safety Data Sheet for Potassium indigotetrasulfonate, Sigma-Aldric Corporation, Dec. 13, 2012, 6 pages.
Miller et al., "Leak Detection in Vacuum Bags," U.S. Appl. No. 13/892,916, filed May 13, 2013, 48 pages.
Notice of Allowance, dated May 10, 2013, regarding U.S. Appl. No. 11/751,931, 49 pages.
Office Action dated Mar. 21, 2013, regarding U.S. Appl. No. 12/200,882, 47 pages.

(56) References Cited

OTHER PUBLICATIONS

Office Action, dated Mar. 26, 2013, regarding U.S. Appl. No. 13/657,137, 41 pages.
Office Action, dated Apr. 1, 2013, regarding U.S. Appl. No. 12/764,202, 38 pages.
European Search Report dated Dec. 2, 2013 regarding Application No. EP09792061.5-1753, 6 pages.
Notice of Allowance, dated Dec. 4, 2013, regarding U.S. Appl. No. 12/200,882, 17 pages.
Notice of Allowance, dated Dec. 6, 2013, regarding U.S. Appl. No. 12/764,202, 20 pages.
Buckingham et al., "Automating the manufacture of composite broadgoods", Composites Part A, vol. 27A, No. 3, Copyright 1996, pp. 191-200.
EP Search Report dated Mar. 14, 2012 regarding P46438EP1/JEP, application No. 12151305.5-2307, applicant The Boeing Company, 6 pages.
PCT Search Report dated Feb. 1, 2010 regarding 07-0638A PCT, application No. PCT/US2009/055378, applicant The Boeing Company, 5 pages.
Response to Office Action dated Nov. 6, 2009 for U.S. Appl. No. 12/200,882, 2 pages.
USPTO Requirement for Restriction dated Feb. 23, 2010 for U.S. Appl. No. 12/200,882, 7 pages.
Response to Requirement for Restriction dated Mar. 22, 2010 for U.S. Appl. No. 12/200,882, 8 pages.
USPTO Requirement for Restriction dated Jan. 21, 2011 for U.S. Appl. No. 11/751,928, 5 pages.
Response to Requirement for Restriction dated Feb. 21, 2011 for U.S. Appl. No. 11/751,928, 11 pages.
Response to Office Action dated May 19, 2011 for U.S. Appl. No. 11/751,928, 20 pages.
Amendment submitted with RCE dated Sep. 19, 2011 for U.S. Appl. No. 11/751,928, 14 pages.
USPTO Requirement for Restriction dated Mar. 19, 2010 for U.S. Appl. No. 11/751,931, 7 pages.
Response to Requirement for Restriction dated Apr. 19, 2010 for U.S. Appl. No. 11/751,931, 10 pages.
Response to Office Action dated Jul. 20, 2010 for U.S. Appl. 11/751,931, 24 pages.
Response to Final Office Action dated Oct. 15, 2010 for U.S. Appl. No. 11/751,931, 4 pages.
Amendment submitted with RCE dated Nov. 12, 2010 for U.S. Appl. No. 11/751,931, 30 pages.
Response to Office Action dated Aug. 17, 2011 for U.S. Appl. No. 11/751,931, 26 pages.
Amendment submitted with RCE dated Mar. 28, 2012 for U.S. Appl. No. 11/751,931, 18 pages.
Office Action, dated May 22, 2014, regarding USPTO Application No. 12/768,007, 67 pages.

\* cited by examiner

COMPOSITE MANUFACTURING METHOD

RELATED APPLICATIONS

The disclosure is related to U.S. patent application Ser. Nos. 11/751,928 and 11/751,931, both filed on May 22, 2007.

TECHNICAL FIELD

The disclosure relates generally to aircraft production. More particularly the disclosure relates to manufacturing methods and apparatus which utilize composite modules to fabricate components and structures.

BACKGROUND

Some components of modern commercial aircraft, such as the aircraft fuselage skin, for example, may be fabricated using advanced fiber placement (AFP) machines. The baseline process of using AFP machines for aircraft fabrication processes may require a high capital investment in the purchase of many AFP machines, tooling, factory floor space and personnel. At current AFP lay-down rates (e.g., about 15 lbs/hr), a large number of AFP machines may be required to place the quantity of material which is needed to support the acceptable production rates of commercial aircraft.

Therefore, a manufacturing method is needed which may have a relatively high rate capacity and lower capital investment requirements and may not require skilled operators and programmers for implementation.

SUMMARY

The disclosure is generally directed to a composite manufacturing method. An illustrative embodiment of the method includes providing a plurality of composite modules; inspecting the composite modules; providing a curing tool; and placing the composite modules on the curing tool.

The method provides a high manufacturing rate and requires only lower capital investment. Moreover, the manufacturing method may not require skilled operators and programmers for implementation.

BRIEF DESCRIPTION OF THE ILLUSTRATIONS

DETAILED DESCRIPTION

Figure 1:
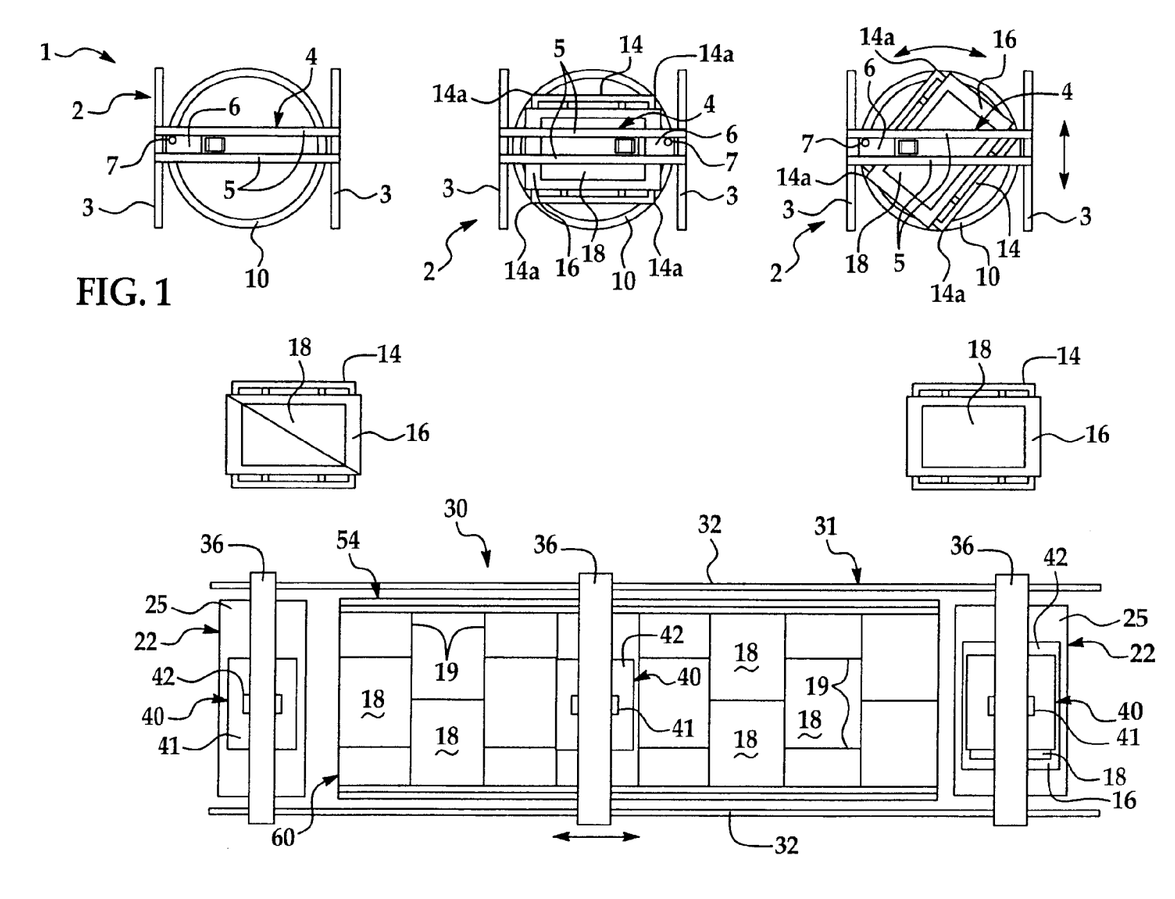
FIG. 1 is a schematic top view of a manufacturing system which is suitable for implementation of an illustrative embodiment of the modular composite fuselage skin manufacturing method.
Figure 2:
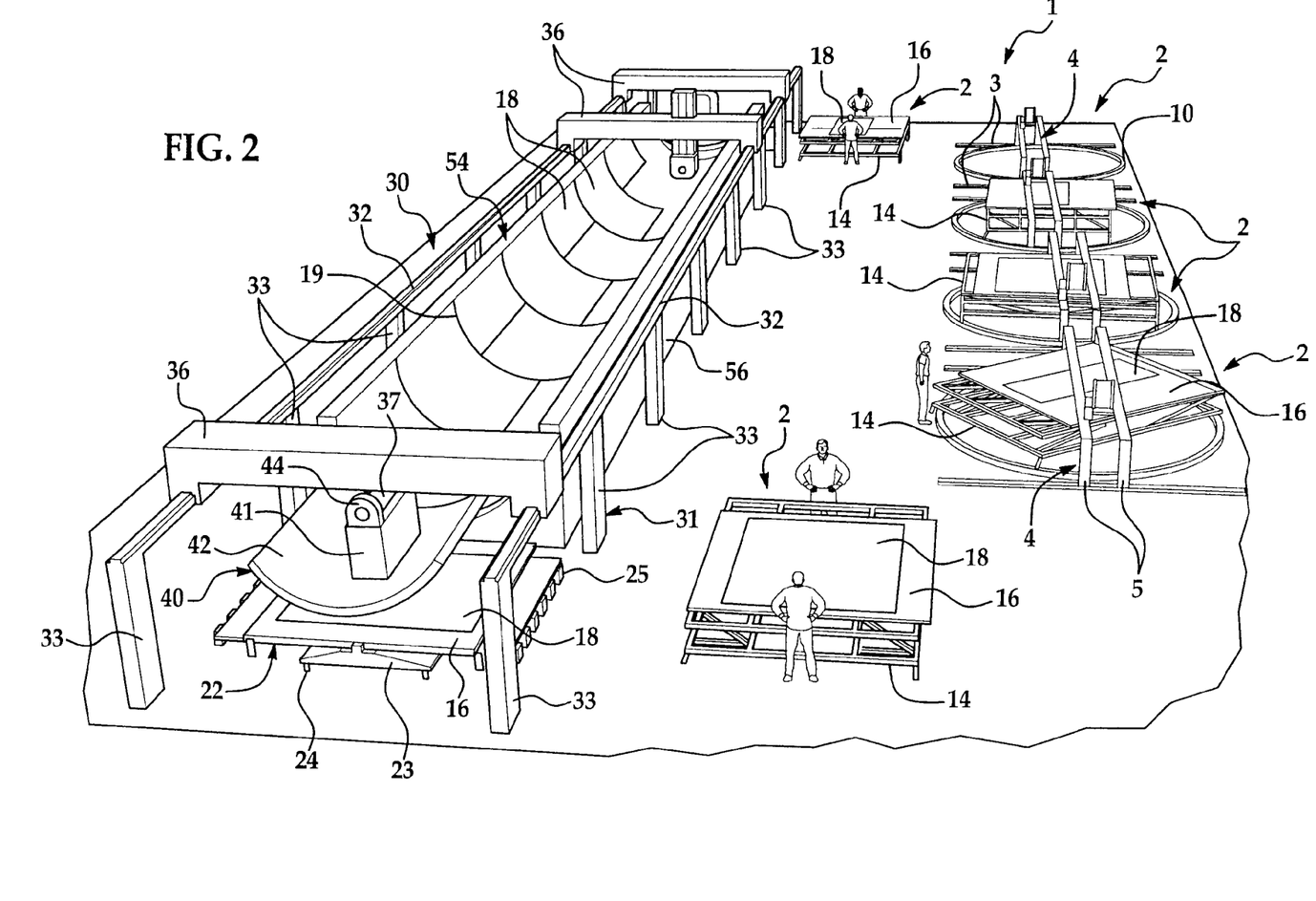
FIG. 2 is a perspective view of a manufacturing system which is suitable for implementation of an illustrative embodiment of the modular composite fuselage skin manufacturing method.
Figure 3:
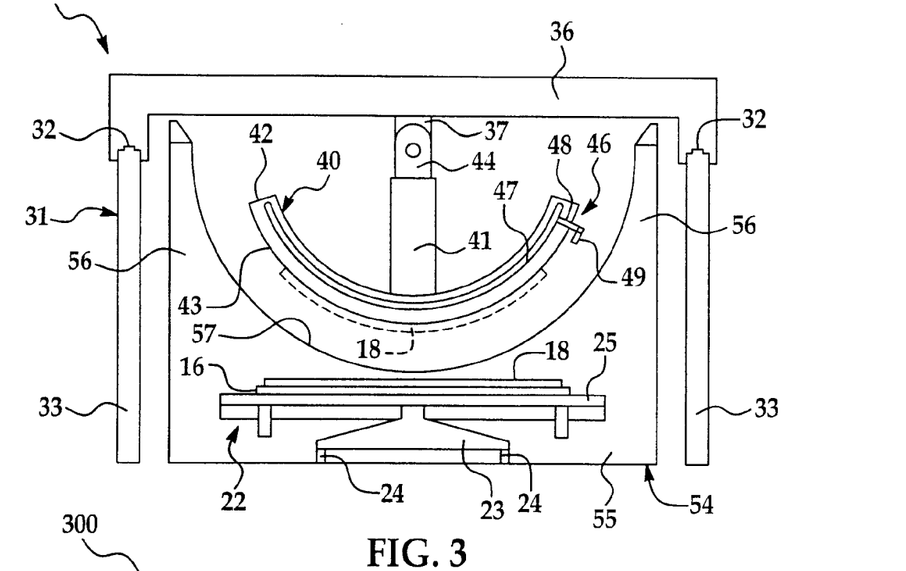
FIG. 3 is an end view of an SADL (semi-automated doubler locator) machine, a pick and place machine and a cure tool.

Referring initially to FIGS. 1-3 of the drawings, a manufacturing system which is suitable for implementation of an illustrative embodiment of the modular composite manufacturing method is generally indicated by reference numeral 1. The manufacturing system 1 is shown in top view in FIG. 1 and in perspective view in FIG. 2. The modular composite manufacturing method may utilize simple, right-sized equipment to enable lay down of composite materials in parallel processes rather than in series as part of the fabrication of composite aircraft fuselages or other parts. The use of a parallel process approach to the automated lamination of aircraft fuselage skin modules or other parts may dramatically reduce the flow time required to fabricate a single part. This may reduce the capital investment, factory floor space and support staff required to fabricate composite aircraft fuselage skins or other parts. Furthermore, the method may be used in the fabrication of flat-layup composite parts such as aircraft fuselage skins, for example and without limitation or contoured-layup composite parts such as aircraft wing skins and stabilizers for example and without limitation. The method may be used to fabricate panels, quarter sections, half fuselage sections, more than half fuselage sections or full barrel sections.

As shown in FIGS. 1 and 2, the manufacturing system 1 may include one or multiple flat tape layup machines (FTLMs) 2 to facilitate fabrication of flat-layup composite parts such as aircraft fuselage skins, for example and without limitation. Additionally or alternatively, the manufacturing system 1 may include one or multiple contour type layup machines (CTLMs) (not shown) to facilitate fabrication of contoured-layup composite parts such as aircraft wing skin, nose skin and/or tail skin, for example and without limitation. The FTLM and CTLM may have a design which is known to those skilled in the art. Although an exemplary structure and method of operation for the FTLM 2 will be hereinafter described, it will be recognized and understood that the same method of operation may be utilized with respect to one or more CTLMs in addition to or instead of the FTLMs 2.

Each FTLM 2 may include a pair of generally elongated, parallel, spaced-apart frame track rails 3. A carriage frame 4 may span and be adapted to bi-directionally traverse the frame track rails 3. The carriage frame 4 may include a pair of generally elongated, parallel, spaced-apart carriage frame members 5. The carriage frame members 5 may be oriented in generally perpendicular relationship with respect to the frame track rails 3.

A cutting carriage 6 may be adapted to bi-directionally traverse the carriage frame members 5 of the carriage frame 4. A carriage motor (not shown) may engage the cutting carriage 6 to facilitate movement of the cutting carriage 6 on the carriage frame 4. A cutting device 7 may be provided on the cutting carriage 6. In some embodiments, the cutting device 7 may be an ultrasonic knife, although alternative cutting implements which are known by those skilled in the art and suitable for the purpose may be used.

A transfer platform rotation track 10, which may be circular or annular, may be provided between the frame track rails 3 and beneath the carriage frame 4. A transfer platform 14 may be removably provided on the transfer platform rotation track 10. The transfer platform 14 may have a generally square shape. The corner portions 14a of the transfer platform 14 may slidably or rotatably engage the transfer platform rotation track 10 according to the knowledge of those skilled in the art such as through rollers (not shown), for example and without limitation. As will be hereinafter described, a carrier sheet 16 may be placed on the transfer platform 14. A composite module 18 may be placed on the carrier sheet 16. The transfer platform 14 may be rotated on the transfer platform rotation track 10, the carriage frame 4 may be moved along the frame track rails 3 and the cutting carriage 6 may be moved along the carriage frame members 5 of the carriage frame 4 to facilitate cutting of the composite module 18 along a selected axis or axes by operation of the cutting device 7.

As shown in FIGS. 1-3, the manufacturing system 1 may further include a SADL (Semi-Automated Doubler Locator) machine 22. The SADL machine 22 may include a pedestal 23 which may be rendered portable by multiple pedestal wheels 24. A module forming platform 25 may be provided on the pedestal 23. The module forming platform 25 may be adapted to receive and support a carrier sheet 16 on which is laid a composite module 18 for purposes which will be hereinafter described.

As further shown in FIGS. 1-3, the manufacturing system 1 may further include a pick and place machine 30. As shown in FIGS. 1 and 2, the pick and place machine 30 may be situated generally adjacent to the SADL machine 22. As further shown in FIG. 1, in some embodiments an SADL machine 22 may be provided at or generally adjacent to respective ends of the pick and place machine 30. The pick and place machine 30 may include a gantry 31 having a pair of generally elongated, parallel, spaced-apart rails 32. The rails 32 of the gantry 31 may each be supported by multiple, spaced-apart rail supports 33 as shown in FIG. 3. At least one placement head carriage 36 may span and slidably engage the rails 32 of the gantry 31. Each placement head carriage 36 may be adapted for bi-directional travel on the rails 32, as indicated by the double-headed arrow 8 in FIG. 1. A carriage motor (not shown) may engage each placement head carriage 36 to facilitate movement of the placement head carriage 36 on the rails 32.

As shown in FIGS. 2 and 3, a module placement head 40 may be suspended from each placement head carriage 36. The module placement head 40 may include a head shaft 41 and a generally curved or arcuate module engaging member 42. The head shaft 41 of the module placement head 40 may be attached to the placement head carriage 36 using any suitable technique which is known to those skilled in the art. In some embodiments, at least one head mount flange 37 extends from the placement head carriage 36. At least one module attachment bracket 44 extends from the head shaft 41. The module attachment bracket 44 may be connected to the at least one head mount flange 37 via a head fastening member 38.

As further shown in FIGS. 2 and 3, the module engaging member 42 of the module placement head 40 may include a generally convex module forming surface 43. A scanner 49 of an inspection scanner system 46 may be adapted to traverse the module forming surface 43 of the module engaging member 42. The scanner 49 may be attached to the module engaging member 42 according to the knowledge of those skilled in the art for the purpose. In some embodiments, a generally elongated, curved scanner slot 47 may be provided in the module engaging member 42 generally adjacent to and along the module forming surface 43. A scanner bracket 48 may engage the scanner slot 47 for traversing the scanner slot 47. The scanner 49 may be provided on the scanner bracket 48. A scanner motor (not shown) may engage the scanner bracket 48 to facilitate selective movement of the scanner bracket 48 in the scanner slot 47 and the scanner 49 along and adjacent to the module forming surface 43 of the module engaging member 42. An inspection analysis and control system (not shown) may be connected to the scanner motor (not shown) and the scanner 49 to facilitate the scanning motion of the scanner 49 and retrieve and analyze images received from the scanner 49.

The manufacturing system 1 may further include a cure tool, mandrel or mold 54. The cure tool 54 may be an OML (Outer Mold Line) or an IML (Inner Mold Line) cure tool, for example and without limitation. As shown in FIGS. 1, 2 and 3, the cure tool 54 may be situated generally adjacent to the SADL machine 22 and between the rails 32 of the pick and place machine 30. As shown in FIG. 3, in some embodiments the cure tool 54 may include a tool base 55 and generally parallel, spaced-apart tool sides 56 which extend from the tool base 55. A generally curved or semicircular module placement surface 57 may be provided in the tool base 55 and the tool sides 56 and may extend along the length of the cure tool 54. However, it will be recognized and understood that the cure tool 54 (such as in the case of IML cure tools, for example) need not necessarily have a full cylindrical or half-cylindrical cross-section as shown with respect to the module placement surface 57 of the cure tool 54. Under circumstances in which it is desired to utilize the manufacturing method on quarter panels, for example and without limitation, cure tools 54 having both an OML and an IML configuration could be used. Furthermore, the cure tool 54 may be configured as a wing or stabilizer mold, tool, cure tool or in any configuration depending on the part which is to be fabricated.

In typical implementation of the modular composite manufacturing method, the method may be used to fabricate an aircraft fuselage skin 60 (FIG. 1) using the multiple composite modules 18. Depending on the application and the part which is to be fabricated, each module 18 may include any combination of unidirectional carbon fiber prepreg; carbon fiber prepreg fabric; fiberglass; KEVLAR® [poly (p-phenyleneterephtalamide); or other materials. Each module 18 may have at least one ply. A carrier sheet 16, on which may be laid a composite module 18, may initially be placed on a transfer platform 14. The transfer platform 14 may be placed on the annular transfer platform rotation track 10 of a FTLM 2. The cutting device 7 on the cutting carriage 6 may be operated to trim or cut the composite module 18 to the desired dimensions and shape. During the trimming, cutting or moduleting operation, the composite module 18 may be positioned at selected orientations with respect to the cutting device 7 by movement of the cutting carriage 6 along the carriage frame members 5 of the carriage frame 4; movement of the carriage frame 4 along the frame track rails 3; and/or rotation of the transfer platform 14 on the transfer platform rotation track 10. Each FTLM 2 may facilitate high-speed moduleting of the composite modules 18 which are to form the aircraft fuselage skin 60 using net trim technology.

After trimming or cutting of the composite module 18 the transfer platform 14, on which is laid the carrier sheet 16 and the trimmed or cut composite module 18, may be removed from the transfer platform rotation track 10. The transfer platform 14 may be transported from the FTLM 2 to one of the SADL machines 22. Removal of the transfer platform 14 from the transfer platform rotation rack 10 and/or transportation of the transfer platform 14 may be automated or manual. At the SADL machine 22, the carrier sheet 16 may be removed from the transfer platform 14 and placed on the module forming platform 25 of the SADL machine 22. The carrier sheet 16 may be provided with multiple tooling/index openings (not shown) which may be indexed to the SADL machine 22 to facilitate proper positioning and placement of the carrier sheet 16 on the module forming platform 25.

The placement head carriage 36 may next be operated to slide along the rails 32 on the gantry 31 of the pick and place machine 30 to position the module engaging member 42 of the module placement head 40 directly over the composite module 18. The module forming platform 25 of the SADL machine 22 may then be raised against the module forming surface 43 of the module engaging member 42 to form or contour the flat composite module 18 to the generally convex contour of the module forming surface 43, as indicated in phantom in FIG. 3, through a module-compaction process. Forming and contouring of the module 18 to the module forming surface 43 of the module engaging member 42 may be automated. Additional composite modules 18 may be transported from the FTLM machine 2 to the module forming platform 25 of the SADL machine 22 and formed to the module forming surface 43 of the module engaging member 42 in a laminated or multi-ply manner as needed to achieve a desired thickness of the aircraft fuselage skin 60 (FIG. 1). Accordingly, successive composite modules 18 may be placed on each other to form a laminated module 18 having multiple plies. Depending on the application, the module placement head 40 may place continuous fiber plies or continuous fabric plies in conjunction with knitted plies of the composite modules 18. In some applications, adjacent modules 18 may be coupled to each other according to the knowledge of those skilled in the art. It will be recognized and understood that the composite modules 18 need not always be formed onto the module forming surface 43 of the module engaging member 42 on the module placement head 40. In the case of an IML curing tool 54, the modules 18 may be formed directly onto the curing tool 54 or onto other skin plies using the SADL machine 22.

After the desired number of composite modules 18 has been staged on the module placement head 40 of the pick and place machine 30, the scanner 49 of the inspection scanner system 46 may be operated to traverse the module forming surface 43 of the module engaging member 43 for the purpose of inspecting the composite modules 18. Defective composite modules 18 may be removed from the module placement head 40 and replaced with non-defective composite modules 18. Inspection of the modules 18 on the module placement head 40 may be an automated process.

The placement head carriage 36 of the pick and place machine 30 may then be operated to traverse the rails 32 on the gantry 31 of the pick and place machine 30 and facilitate precision placement of the stacked, laminated, compressed and inspected composite modules 18 in the desired location on the module placement surface 57 (FIG. 3) of the cure tool 54. Additional stacked, laminated and compressed modules 18 may be formed in similar manner and placed in the desired locations on the module placement surface 57 to form the aircraft fuselage skin 60. Module edges 19 of adjacent modules 18 may be ramped and overlapped with a scarf (not shown) or ramped splice joint (not shown) until the aircraft fuselage skin 60 is completely laid up.

Figure 4:
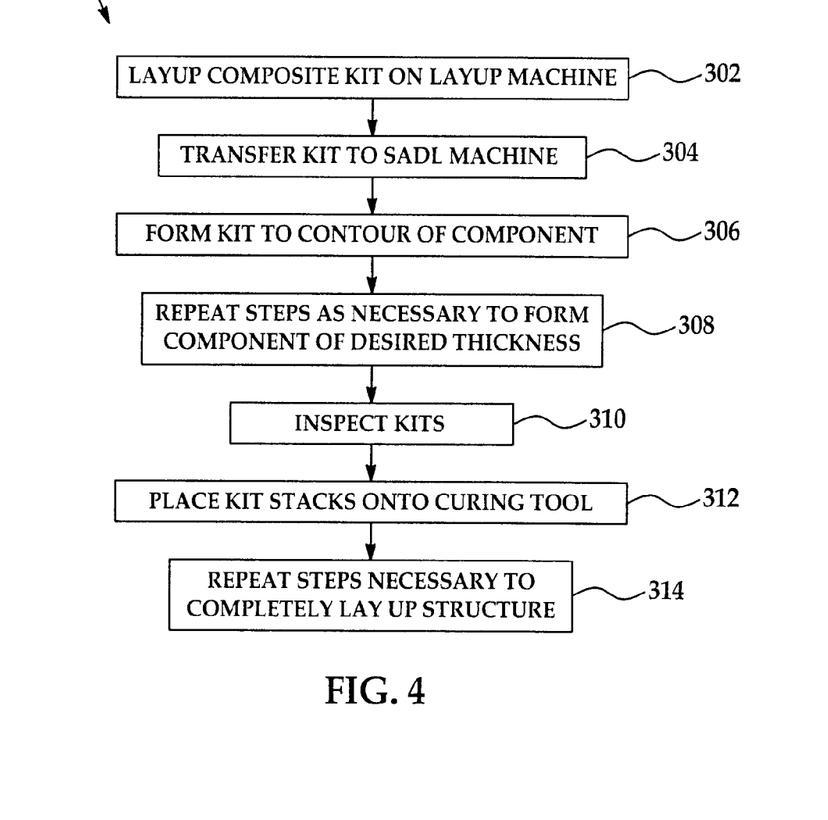
FIG. 4 is a flow diagram which summarizes an illustrative embodiment of the modular composite fuselage skin manufacturing method.

Referring next to the flow diagram 300 in FIG. 4, an illustrative embodiment of a modular composite manufacturing method is summarized. The method may be used to fabricate an aircraft fuselage skin having a desired thickness, for example and without limitation. In block 302, a composite module may be laid up. The module may be an aircraft fuselage skin module which may be used to fabricate a structure such as an aircraft fuselage skin, for example and without limitation, and may be laid up using an FTLM (Flat Tape Layup Machine), for example and without limitation. Additionally or alternatively, the module may be used to fabricate a structure such as an aircraft wing skin, nose skin or tail skin, for example and without limitation, in which case the module may be laid up using a CTLM (contour tape layup machine). In block 304, the module may be transferred to an SADL (Semi-Automated Doubler Locator) machine. In block 306, the module may be formed to the contour of an aircraft fuselage skin or other structure. In block 308, the steps carried out in blocks 302, 304 and 306 may be repeated to form a desired thickness of the aircraft fuselage skin or other structure. In block 310, the modules may be inspected. In block 312, the stacked or laminated modules may be stacked onto a curing tool. The curing tool may be an OML (Outer Mold Line) or IML (Inner Mold Line) curing tool, for example and without limitation. In block 314, the steps carried out in blocks 302, 304, 306, 308, 310 and 312 may be repeated as necessary to completely lay up the aircraft fuselage skin or other structure.

Figure 5:
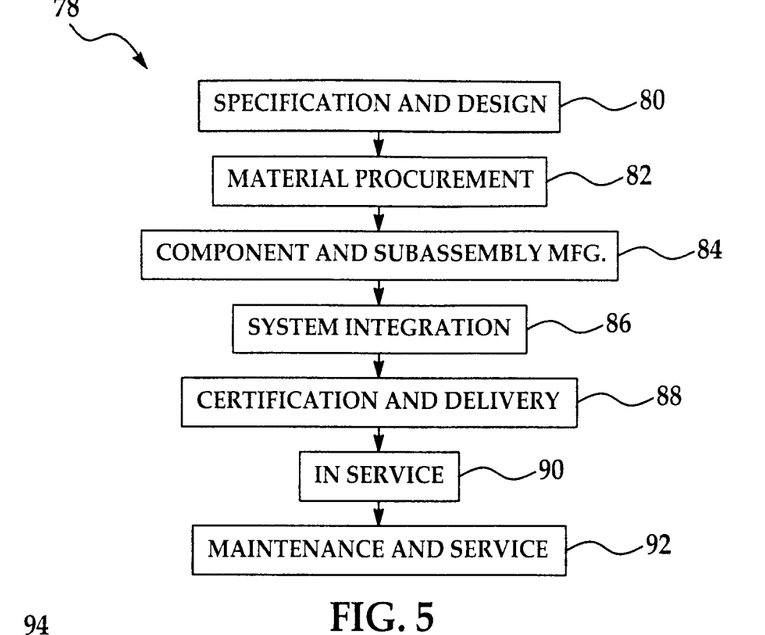
FIG. 5 is a flow diagram of an aircraft production and service methodology.
Figure 6:
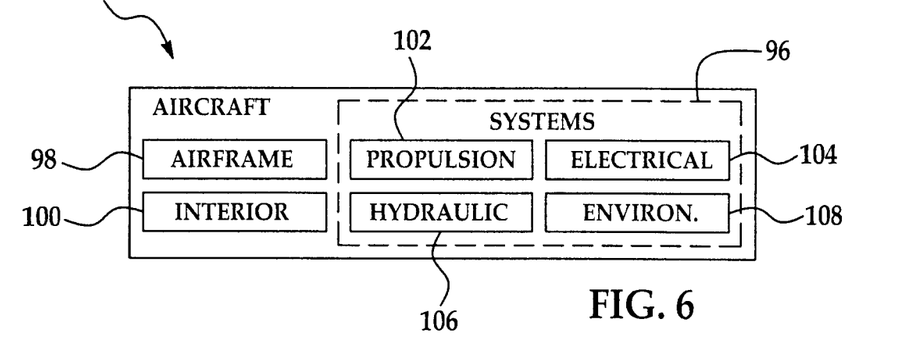
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

As previously mentioned, the modular composite manufacturing method may utilize right-sized equipment to enable lay up of composite materials in parallel processes rather than in series as part of the fabrication of composite aircraft fuselages or other parts. In this regard, reference is made to FIGS. 7 and 8. According to a number of embodiments, a method 700 of manufacturing a composite structure may include placing 702 a plurality of the modules 18 on the tool 54 such that each of the modules 18 is adjacent to at least another one of the modules 18, such as shown in FIG. 9 and such that adjacent modules 18 are bondable together, such as at a joint 704, to form a composite structure.

In some of the embodiments, more than one module 18 may be placed on the tool 54 at substantially the same time; in such embodiments, a plurality of the transfer platforms 14 may be provided. In addition, in forming the composite structure, the modules 18 may be placed on the tool 54 in a substantially sequential manner, with a post-placement procedure 706 being performed on one of the modules 18 that has already been placed on the tool 18 (as indicated by the notation n-2 in FIG. 8) while a subsequent module 18 is being placed on the tool 54 (as indicated by the notation n-1 in FIG. 8). In many embodiments, the placing step 702 and the post-placement process step 706 may be carried out while a subsequent module 18 is being prepped 708 for placement (as indicated by the notation n in FIG. 8).

Figure 7:
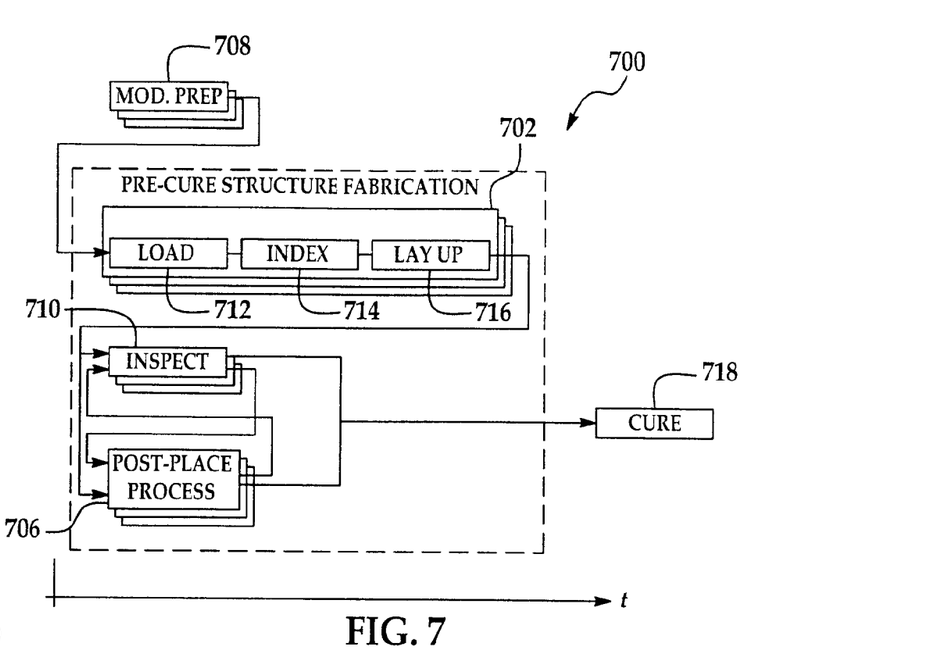
FIG. 7 is a flow diagram illustrating embodiments for manufacturing composite structures.
Figure 8:
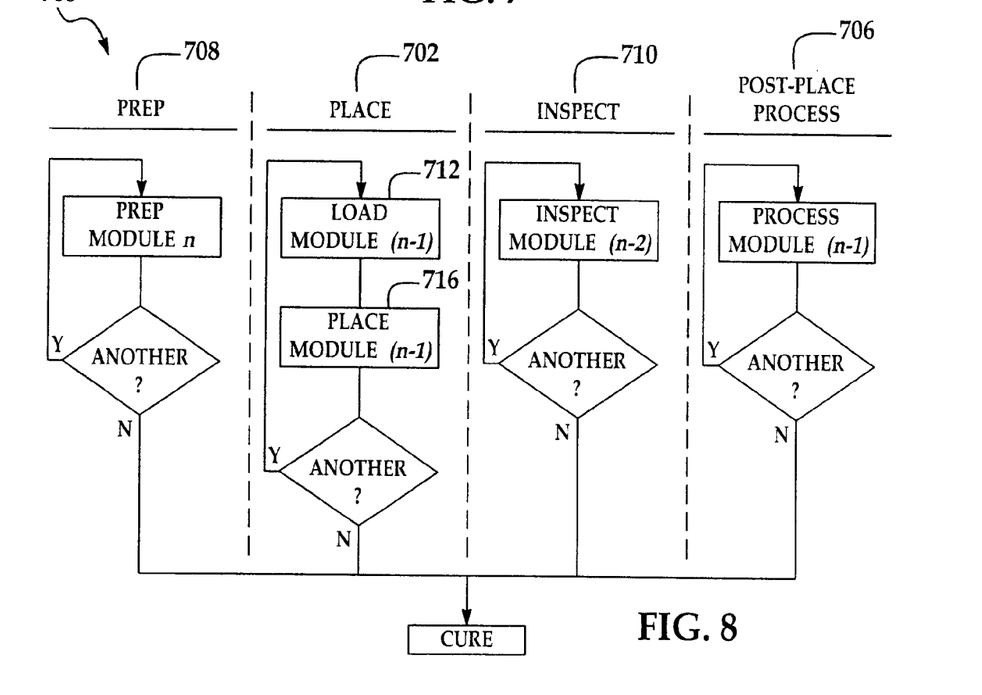
FIG. 8 illustrates additional embodiments for fabricating composite structures.
Figure 9:
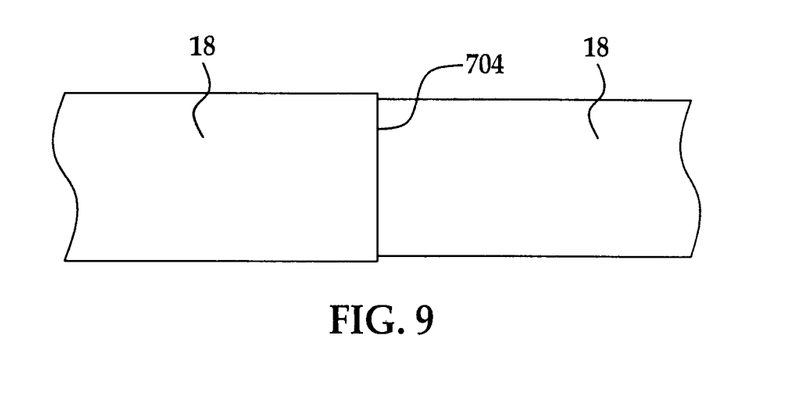
FIG. 9 is cross-sectional view of adjacently placed composite modules.

Regarding performing a post-placement procedure 706, this may include inspecting 710 one of the modules 18 that has already been placed on the tool 18 (as indicated by the notation n-2 in FIG. 8). The performing 706 of a post-placement procedure may also including working on the joint 704 formed between adjacent modules 18. In some of the embodiments such as shown in FIGS. 7 and 8, the fabrication method 700 may include performing, for example, the inspecting steps 710 and the post-placement process step 706 on different placed modules 18 at substantially the same time.

In many embodiments, the placing 702 of a module 18 on a tool 54 may include loading 712 a module 18 on a transfer platform 14, indexing 714 the loaded module into a proper position, and/or then laying up 716 the module onto a tool 54. After all of the modules 18 have been placed on the tool 54 and any subsequent post-placement process 706 has been carried out, then the structure may be cured Although the embodiments of this disclosure have been described with respect to certain exemplary embodiments, it is to be understood that the specific embodiments are for purposes of illustration and not limitation, as other variations will occur to those of skill in the art.

What is claimed is:

1. A modular composite aircraft skin manufacturing method, comprising:
   manufacturing on a first module manufacturing machine in a first manufacturing process a first composite module of a plurality of composite modules, the first composite module comprising a corresponding plurality of uncured plies;
   manufacturing on a second module manufacturing machine in a second manufacturing process a second composite module of the plurality of composite modules, the second composite module comprising a corresponding plurality of uncured plies;
   carrying out the first manufacturing process and the second manufacturing process in parallel;
   applying the first composite module in an uncured state to a support structure; and
   applying the second composite module in an uncured state adjacent to the first composite module on the support structure such that a first edge of the first composite module and a second edge of the second composite module overlap to form a joint to form the aircraft skin; and
   curing the aircraft skin.

2. The method of claim 1 further comprising imparting a corresponding contour to each composite module in the plurality of composite modules.

3. The method of claim 1 further comprising coupling adjacent ones of the plurality of composite modules along a corresponding edge to each other.

4. The method of claim 1 further comprising applying a third composite module of the plurality of modules horizontally adjacent to a fourth composite module of the plurality of modules such that a third edge of the third composite module and a fourth edge of the fourth composite module overlap to form a joint, and wherein the third composite module and the fourth composite module are placed substantially on top of the first composite module and the second composite module.

5. The method of claim 1 wherein a composite module further comprises ramped module edges.

6. The method of claim 1 wherein the support structure comprises an outer mold line tool.

7. The method of claim 1 wherein the support structure comprises an inner mold line tool.

8. The method of claim 1 further comprising inspecting a third composite module of the plurality of composite modules.

9. The method of claim 1 wherein applying further comprises placing more than one composite module of the plurality of composite modules on the support structure at substantially the same time.

10. The method of claim 1 wherein the plurality of composite modules comprises a plurality of corresponding distinct panels, wherein the first composite module is a first panel, wherein the second composite module is a second panel, and wherein the aircraft skin comprises a fuselage of an aircraft.

11. The method of claim 10 wherein the plurality of corresponding distinct panels, the first panel, and the second panel are each smaller than a perimeter of the fuselage.

12. The method of claim 10 wherein the plurality of corresponding distinct panels, the first panel, and the second panel are further each smaller than a length of the fuselage.

13. The method of claim 1 further comprising:
   manufacturing a third composite module, wherein manufacturing the third composite module is performed on a third module manufacturing machine in parallel with manufacturing the first composite module and manufacturing the second composite module;
   applying the third composite module to the support structure, including applying a third edge of the third composite module to a fourth edge of one of the first composite module and the second composite module, wherein the fourth edge is different than either the first edge or the second edge.

14. The method of claim 13 wherein the fourth edge is of the first composite module and wherein the fourth edge is substantially perpendicular to the first edge.

15. The method of claim 1, further comprising:
   positioning the first composite module on a module forming platform using multiple tooling openings of a carrier sheet of the first composite module.

16. The method of claim 1 wherein the joint comprises a ramped scarf joint or a ramped splice joint.

17. A method of manufacturing a composite structure, the method comprising:
   manufacturing on a first module manufacturing machine in a first manufacturing process a first composite module of a plurality of composite modules, wherein the first composite module comprises a corresponding plurality of uncured plies;
   manufacturing on a second module manufacturing machine in a second manufacturing process a second composite module of the plurality of composite modules, the second composite module comprises a corresponding plurality of uncured plies;

applying the plurality of composite modules on a support structure, such that each of the plurality of composite modules is horizontally adjacent to at least another of the plurality of composite modules, to form a composite structure; and curing the composite structure.

18. The method of claim 17 wherein applying comprises applying more than one composite module of the plurality of composite modules on the support structure at substantially the same time.

19. The method of claim 17 wherein applying comprises applying the plurality of composite modules on the support structure in a sequential manner, the method further comprising:

performing a post-application procedure on the first composite module, wherein the first composite module has been applied on the support structure, and wherein performing the post-application procedure occurs while the second composite module is being applied on the support structure, wherein performing a post-application procedure comprises inspecting the first composite module.

20. The method of claim 19 wherein performing a post-application procedure comprises working on a joint formed between the first composite module and a third composite module of the plurality of composite modules, wherein the third composite module is horizontally adjacent to the first composite module on the support structure.

21. A method of manufacturing an aircraft skin comprising a plurality of prefabricated modules, the method comprising:

manufacturing on a first module manufacturing machine in a first manufacturing process a first prefabricated module of a plurality of prefabricated modules, wherein the first prefabricated module comprises a corresponding plurality of uncured plies;

manufacturing on a second module manufacturing machine in a second manufacturing process a second prefabricated module of the plurality of prefabricated modules, the second prefabricated module comprises a corresponding plurality of uncured plies;

laying up the first prefabricated module on a support structure, wherein laying up comprises applying the first prefabricated module on the support structure;

laying up the second prefabricated module on the support structure to form an aircraft skin, wherein laying up comprises applying the second prefabricated module on the support structure;

performing a first post-lay up procedure on the first prefabricated module on the support structure;

performing a second post-lay up procedure on the second prefabricated module on the support structure, wherein the second post-lay up procedure is performable at substantially the same time as the first post-lay up procedure; and curing the aircraft skin.

22. The method of claim 21 wherein the first prefabricated module and the second prefabricated module may be laid up on the support structure at substantially the same time.

23. The method of claim 21 wherein the first post lay up procedure and the second post-lay up procedure comprise an inspection procedure.

24. The method of claim 21 wherein the first manufacturing process and the second manufacturing process are carried out at substantially the same time.

25. A modular composite manufacturing method, comprising:

providing a plurality of module manufacturing machines, wherein the plurality of module manufacturing machines are configured to operate independently and in parallel;

generating a plurality of composite modules on the plurality of module manufacturing machines, wherein each of the plurality of composite modules comprises a corresponding plurality of uncured plies;

providing a support structure;

applying the plurality of composite modules to the support structure, wherein each composite module of the plurality of composite modules is placed horizontally adjacent to another composite module of the plurality of composite modules such that corresponding edges of the respective composite modules overlap to form a joint, and wherein applying the plurality of composite modules to the support structure forms a aircraft skin, the aircraft skin comprising only the plurality of composite modules;

performing a post-application procedure on a first composite module of the plurality of composite modules on the support structure;

curing the aircraft skin; and wherein generating, applying, and performing are performed in parallel.

* * * * *